(12) United States Patent
Dörfel et al.

(10) Patent No.: US 9,092,263 B2
(45) Date of Patent: Jul. 28, 2015

(54) METHOD FOR GENERATING AN OPTIMISED HARDWARE/SOFTWARE PARTITIONING OF EMBEDDED SYSTEMS USING A PLURALITY OF CONTROL APPLIANCES

(75) Inventors: Matthias Dörfel, Emmering (DE); Ralf Münzenberger, Erlangen (DE)

(73) Assignee: INCHRON, GMBH, Potsdam (DE)

( * ) Notice: Subject to any disclaimer, the term of this patent is extended or adjusted under 35 U.S.C. 154(b) by 389 days.

(21) Appl. No.: 13/518,709

(22) PCT Filed: Dec. 23, 2009

(86) PCT No.: PCT/EP2009/067855
§ 371 (c)(1),
(2), (4) Date: Sep. 17, 2012

(87) PCT Pub. No.: WO2011/076276
PCT Pub. Date: Jun. 30, 2011

(65) Prior Publication Data
US 2013/0007756 A1 Jan. 3, 2013

(51) Int. Cl.
*G06F 9/46* (2006.01)
*G06F 9/48* (2006.01)

(52) U.S. Cl.
CPC .................... *G06F 9/4887* (2013.01)

(58) Field of Classification Search
USPC .......................................... 718/103
See application file for complete search history.

(56) References Cited

U.S. PATENT DOCUMENTS

| | | | |
|---|---|---|---|
| 7,979,860 B2 * | 7/2011 | Hill ............................ | 718/102 |
| 2006/0112390 A1 * | 5/2006 | Hamaoka ...................... | 718/102 |
| 2009/0144739 A1 * | 6/2009 | Goel et al. .................... | 718/103 |

OTHER PUBLICATIONS

Albers et al., An Event Stream Driven Approximation for the Analysis of Real-Time Systems, Aug. 10, 2004, Department of Computer Science, University of Oldenburg.*

(Continued)

*Primary Examiner* — Emerson Puente
*Assistant Examiner* — Steven Do
(74) *Attorney, Agent, or Firm* — Hoffmann & Baron, LLP

(57) ABSTRACT

The present invention relates to a computer-implemented method for an automatic synthesis of distributed embedded systems, wherein the tasks to be processed by the system are mapped to a hardware structure having a plurality of processing units such that predefined time limits of the tasks are met, comprising the steps of (a) assigning the tasks to the plurality of processing steps, with the following substeps: (aa) assigning a task to a processing unit; (bb) determining the outgoing event densities; (cc) comparing the output density towards the next task with a predefined threshold and assigning the next task to the same processing unit if the event density is below the threshold or assigning the next task to any other processing unit if the event density is smaller than the threshold; (dd) repeating steps (aa) to (cc) until all tasks are assigned to the processing units; (b) checking whether the costs of the given task assignment to the processing units satisfy a predefined solution criterion; (c) repeating steps (a) to (b) with a new task assignment to the processing units until the task assignment fulfills the predefined solution criteria; (d) assigning the tasks to the processes of the operational systems of the processing units assigned to the tasks; (e) checking whether the given task assignment to the processes of the operational systems of the processing units satisfies the predefined time criteria of the tasks; (f) calculating the costs associated with the given task assignment to the processes of the operational systems of the processing units if the predefined time criteria of the tasks are satisfied; (g) repeating steps (a) to (c) with a new task assignment to the processing units or repeating steps (d) to (f) with a new task assignment to the processes of the operational systems of the assigned processing units until the costs of the current solution satisfy a predefined solution criterion.

17 Claims, 1 Drawing Sheet

(56) References Cited

OTHER PUBLICATIONS

Albers et al., Advanced Hierarchical Event-Stream Model, Jul. 21, 2008, Embedded Systems/Real-Time Systems, Ulm University.*

Karsten Albers, et al., "Hierarchical Event Streams and Event Dependency Graphs: A New Computational Model for Embedded Real-Time Systems", Real-Time Systems, 2006, 18th Euromicro Conference on Dresden, Germany Jul. 5-7, 2006, Piscataway, NJ, USA.

Frank Bodmann, et al.,"Analyzing the Timing Characteristics of Task Activations", Industrial Embedded Systems, 2006, IES '06, International Symposium on Industrial Embedded Systems, PI, Oct. 1, 2006.

English Translation of the International Preliminary Report on Patentability issued in PCT/EP2009/067855 on Jul. 19, 2012.

Wandeler, Ernesto, "Modular Performance Analysis and Interface-Based Design for Embedded Real-Time Systems" PhD Thesis, Computer Engineering and Networks Laboratory, ETH Zurich, Switzerland, Sep. 2006, Chapter 2.4, Figure 7, pp. 20-23.

Le Boudec, Jean-Yves, et al., "Network Calculus: A Theory of Deterministic Queuing Systems for the Internet, Lecture Noes in Computer Science", Chapter 1.1.3, pp. 6-7, Springer 2001.

* cited by examiner

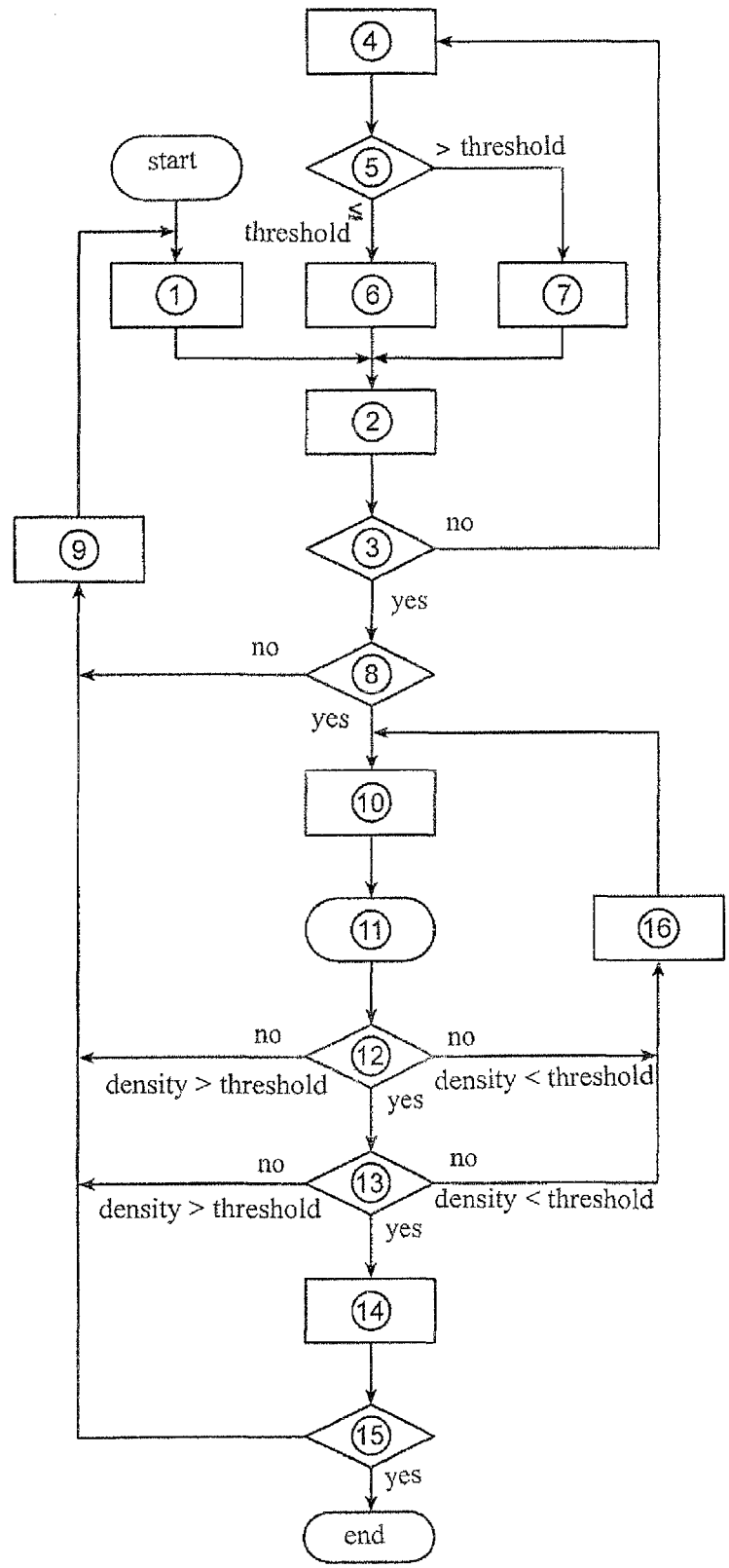

METHOD FOR GENERATING AN OPTIMISED HARDWARE/SOFTWARE PARTITIONING OF EMBEDDED SYSTEMS USING A PLURALITY OF CONTROL APPLIANCES

CROSS-REFERENCE TO RELATED APPLICATIONS

This application is the U.S. National Phase of International Application Number PCT/EP2009/067855 filed on Dec. 23, 2009, which is incorporated herein by reference in its entirety.

BACKGROUND

The present invention relates to a computer-implemented method for an automatic synthesis of distributed embedded systems, wherein the tasks to be processed by the system are mapped to a hardware structure having a plurality of processing units such that predefined time limits of the tasks are met.

Methods for an automatic synthesis of distributed embedded systems have long been researched. F. Slomka: *Mehrkriterienoptimierung verteilter Echtzeitsysteme mit Tabu-Search*, doctoral thesis, engineering department of the university of Erlangen-Nuremberg, Fortschritt-Bericht VDI, series 20, no. 353, VDI-Verlag, Dusseldorf, 2002, gives an overview over this research. It is the object of such a system synthesis to map individual tasks to be processed by the system to a hardware architecture. Thus, it has to be decided which tasks have to be implemented by which processor. It is the object of the synthesis to have the given amount of tasks processed by a minimal hardware structure. Most of the time, the tasks have to meet predetermined time limits, which may also be specified by a series of tasks. It must be possible to implement the hardware architecture, including the infrastructure for the software tasks, the operating system, in view of this boundary condition and any further boundary conditions to be specified, such as energy consumption, electrical power consumption and operating temperature at minimal costs, which is mostly expressed by the chip area. For most jobs, the tasks are assigned to the processors by exact or heuristic optimisation methods, whereupon it is checked whether the specified boundary conditions are met. The assignment of the tasks to the processors is systematically changed by the optimisation method until a sufficiently minimal hardware architecture is found or the search may be terminated.

Car manufacturers (OEM) model the different tasks in the field of electricity and electronics as functional diagrams. A functional diagram consists of blocks, wherein each block determines a specific function. Each block may realise a task. The data inputs and outputs of the blocks are interconnected, which shows the data flow between the blocks. For functional correctness, it is important that the blocks are chronologically processed and the stipulated time limits are met. In a first step, the car manufacturer distributes the blocks to control devices without having detailed knowledge of the system architecture (such as number and type of CPUs and peripheral devices, memory size) of the control device, in particular the software architecture (such as scheduling methods, process number, interrupt service routines (ISR), ISR/process priorities). On account of the complexity and the historical restrictions to the block distribution to control devices, this optimisation often yields suboptimal solutions. The time limits are not sufficiently taken into account. In a second step, it is the object of the supplier of a control device to devise a system architecture of the control device which particularly meets the stipulated time limits. If the distribution in the first step is incorrectly selected: first, the real-time criteria of a control device cannot be satisfied. Second, the development of the necessary optimisation measures for achieving real-time capability is quite complex. Third, a hardware oversizing is necessary in view of an optimal solution in the first step. The first item might lead to product recalls and thus to a loss of prestige, whereas the second and third items increase the costs.

SUMMARY

It is the object of the present invention to map the tasks to be processed by an embedded system to a hardware structure having a plurality of processing units such that predefined time limits of the tasks are met. This object is achieved by the features of the claims.

The present invention relates to a computer-implemented method for an automatic synthesis of distributed embedded systems, wherein the tasks to be processed by the system are mapped to a hardware structure having a plurality of processing units such that predefined time limits of the tasks are met. This method comprises the following steps:
(a) assigning the tasks to the plurality of processing units, with the following substeps:
  (aa) assigning a task to a hardware;
  (bb) determining the outgoing data streams and activations (i.e. the output density);
  (cc) comparing the output density towards the next task with a threshold and assigning the next task to the same hardware if the output density is above the threshold or assigning it to any other hardware if the output density is smaller than or equal to the threshold;
  (dd) repeating steps (aa) to (cc) until all tasks are assigned;
(b) checking whether the costs of the given task assignment to the processing units fulfil a predefined solution criterion;
(c) repeating steps (a) to (b) with a new task assignment to the processing units until the tasks fulfil the predefined cost criteria;
(d) assigning the tasks to the processes of the operational systems of the processing units assigned to the tasks;
(e) checking whether the given task assignment to the processes of the operational systems of the processing units meets the predefined time limits of the tasks;
(f) calculating the costs associated with the given task assignment to the processes of the operational systems of the processing units if the predefined time limits of the tasks are met;
(g) repeating steps (a) to (c) with a new task assignment to the processing units or repeating steps (d) to (f) with a new task assignment to the processes of the operational systems of the assigned processing units until the costs of the given solution satisfy a predefined solution criterion.

Preferably, the repetition of the method steps of step (g) depends on optimisation heuristics.

The step of distributing the tasks to hardware considers the data interdependences and event densities. The data interdependences between the tasks are distinguished from the activations of the execution of a task.

The step of assigning the tasks to the processes (d) of the operational systems of the assigned processing units preferably comprises a spectral analysis step of an event for analysing the input and output densities of the data dependences and activations, wherein preferably the event density at the data outputs and activation outputs to subsequent tasks is determined from the event density of the activation of a task in the event spectral analysis step. Moreover, in case of an admissible assignment of the tasks to the processes (d), the determined output densities of the events of the tasks are preferably smaller than or equal to the possible input densities of the events of the subsequent tasks.

The step of assigning the tasks to the processes (d) of the assigned processing units preferably comprises a task partitioning step, wherein tasks are partitioned according to their event input and output densities into partitions, whereupon in the next step, the tasks of the partitions are assigned to the processes of the assigned processing units. Moreover, the task partitioning step preferably comprises a comparison of the event input and/or output densities of the tasks with predefined thresholds. The thresholds and comparative operators are provided or predetermined by the user as specification.

Preferably, a plurality of processes are combined in one process.

Moreover, if there are a plurality of tasks in one process or a plurality of processes in one process or a plurality of processes in one processing unit, the sequence of the plurality of tasks or the plurality of processes is preferably determined by a scheduling method. Such a scheduling method is preferably a time-controlled, priority-controlled or time slot-based scheduling method.

Preferably, mathematical real-time or task calculus methods are used to check whether the given task assignment to the processes of the operational systems of the processing units meet the predefined time limits of the tasks.

The cost calculation made in step (f) preferably considers the energy consumption, the electrical power consumption, the operational temperature or the chip area of at least one of the processing units.

The processing units are preferably processors.

Moreover, the solution criterion preferably takes into account if the costs are below a predefined cost threshold or a cost minimum is found.

The invention will be illustrated in more detail with reference to the attached FIGURE, which shows a flow chart of a preferred embodiment of the present invention.

In contrast to the obvious approach, the optimisation method is not simply supplemented by a further level in which tasks are assigned to processes and processes to hardware.

The method according to the present invention follows a different approach. As in conventional methods, the tasks are first assigned to individual processors.

The assignment of the tasks to the processing units starts with the boundary nodes of the task graph: Tasks that are activated by sensors or supplied with data are preferably placed on the processing units to which the sensors are connected. The same applies to actors. With this first assignment, the implementation time of a task on a selected processing unit can be determined. With the implementation time and the event density of the activation, the event densities of the outgoing data dependences and the activation of the subsequent tasks can be determined using the event spectral analysis (cf. F. Bodmann, K. Albers, F. Slomka: *Analyzing the Timing Characteristics of Task Activations*, Proceedings of the first IEEE Symposium on Industrial Embedded Systems (SIES, October 2006, and D. Albers, F. Bodmann, F. Slomka: *Hierarchical Event Streams and Event Dependency Graphs: A New Computational Model for Embedded Real-Time Systems*. IEEE Proceedings of the 18$^{th}$ Euromicro Conference on Real-Time Systems, July 2006). The in- and outgoing event densities represent a dynamic interface specification of a task that is bound to a process (cf. F. Slomka, F. Bodmann, K. Albers: *Analytische Transaktionsmodellierung*. EDA Workshop, Hanover, VDI-Verlag, Juni 2007). Each edge from a placed task to another task is provided with a weight. The weight corresponds to the data size to be transmitted per event. Activation edges are assigned a weight that corresponds to the smallest data size that can be transmitted. Parallel edges between two tasks are combined to one edge, their weights being added.

The product of weight and event density of an edge is compared to a defined threshold. If the values are high and exceed the threshold, the subsequent task is assigned to the same processing unit. If the values are low, the subsequent task is assigned to a different processing unit. A further communication task is introduced and assigned to the communication resource connecting the two processing units. This is iterated until all tasks are assigned to processing units.

In the next step, it is checked whether the distribution thus obtained meets a given cost criterion. If not, the distribution is rejected and restarted. In the next step, the tasks are assigned to the processes of the operational system. The dynamic interface specification now available may be utilised here. By means of the analysis techniques described in K. Albers, F. Slomka: *Efficient Feasibility Analysis for Real-Time Systems with EDF Scheduling*. Proceedings of the Design Automation and Test Conference in Europe (DATE 05), 2005, and K. Albers, F. Slomka: *An Event Stream Driven Approximation for the Analysis of Real-Time Systems*. 16$^{th}$ Euromicro Conference on Real-Time Systems, IEEE Computer Society Press, Catania, 2004, it can now be checked whether the input and output densities match via data dependences of associated tasks. This is the case if the output density of a task is smaller or equal to the possible input density of the subsequent task. Task partitioning can now be implemented by means of the event densities. If possible, tasks that are connected to high densities via dependences should be transferred to a partition. The density of the events is a kind of closeness measure for partitioning and task to process assignment. In accordance with defined thresholds, it can now be decided whether and, if so, how task partitioning should be continued. If a task partitioning satisfying these criteria is found, the individual tasks can now be combined to processes. Process structures of different hierarchies are definitely admissible. Thus, a plurality of processes can be combined to one process. If a plurality of tasks are combined to a process, a plurality of processes are combined to a process or a plurality of processes are implemented by one processor, the individual task and process sequences must be determined by a scheduling method. It is possible to use different variants, the most common being time-controlled scheduling (EDF), priority-controlled scheduling (RMS/DMS) or time slot-based (TDMA, Time Division Multiple Access) scheduling. On the basis of the given hardware allocation and assignment of the tasks, the observance of the time limits are verified by mathematical real-time calculus (cf. Ernesto Wandeler: *Modular Performance Analysis and Interface-Based Design for Embedded Real-Time Systems*. PhD Thesis, Computer Engineering and Networks Laboratory, ETH Zurich, Switzerland, September 2006).

Alternatively, task calculus methods may also be used, as described in K. Albers, S. Kollmann, F. Bodmann, F. Slomka. Advanced Hierarchical Event-Stream Model and the Real-Time Calculus. Internal report, 289-vts-63281, Ulm University, 2008.

SUMMARY OF THE DRAWINGS

FIG. 1 shows a method for automatic synthesis of distributed embedded systems.

DETAILED DESCRIPTION

In the following, the method according to the present invention will be described step by step by means of a preferred embodiment on the basis of FIG. 1.

In step 1, first a task and the assignment of the task to an optional hardware are selected. Upon this assignment, the data streams and activations of this task representing the output density are determined in step 2. The termination criterion in step 3 is whether all tasks have been assigned. If not, the next task is selected in step 4 from the amount of unassigned tasks. In step 5, the output densities from the assigned tasks to the next selected task are compared with a user-defined threshold. This next task is then assigned to the same hardware if the output density is above a threshold (step 7). Otherwise, the task is assigned to any other hardware if the output density is smaller than or equal to the threshold (step 6). This is carried out until all tasks are assigned (result "yes" in step 3).

In step 8, the costs are checked and compared with a user-defined criterion. If this criterion is not satisfied, an optimisation algorithm is included in step 9 and steps 1 to 8 are repeated. Thus, steps 1 to 8 are repeated with a new task assignment to the processing units until the tasks satisfy the predefined cost criteria.

In step 10, the tasks are assigned to the processes of the operational systems of the processing units assigned to the tasks. In step 11, a real-time scheduling analysis is then carried out. In step 12, it is checked whether the given task assignment to the processes of the operational systems of the processing units satisfy the predefined time criteria of the tasks. If so, the costs associated with the given task assignment to the processes of the operational systems of the processing units are calculated. Otherwise, steps 1 to 8 are repeated with a new task assignment to the processing units (if the time threshold is exceeded) or are repeated starting with step 9 with a new task assignment to the processes of the operational systems of the assigned processing units (if the time threshold is not reached), until the costs of the current solution satisfies a predefined solution criterion. The latter alternative again involves an optimisation step. i.e. step 16.

In step 13 is checked whether the system is Pareto optimal. If so, the solution is stored in step 14.

Eventually, it is checked in step 15 whether the predefined number of optimal solutions has been reached.

The invention claimed is:

1. A computer-implemented method for an automatic synthesis of distributed embedded systems, wherein tasks to be processed by a system are mapped to a hardware structure having a plurality of processing units such that predefined time criteria of the tasks are satisfied, the method comprising the steps of:
   (a) assigning the tasks to the plurality of processing units, with the following substeps:
   1. assigning a task to a hardware;
   2. determining outgoing data streams and activations of the task representing an output density;
   3. comparing the output density towards a next task with a threshold and assigning the next task to the hardware if the output density is above the threshold or assigning the next task to another hardware if the output density is smaller than or equal to the threshold;
   4. repeating substeps 1. to 3. until all of the tasks are assigned;
   (b) checking whether costs of a given task assignment to the processing units satisfy a predefined solution criterion;
   (c) repeating steps (a) to (b) with a new task assignment to the processing units until the tasks fulfil the predefined solution criterion;
   (d) assigning the tasks to processes of operational systems of the processing units assigned to the tasks;
   (e) checking whether the given task assignment to the processes of the operational systems of the processing units satisfy a predefined time criteria of the tasks;
   (f) calculating costs associated with the given task assignment to the processes of the operational systems of the processing units if the predefined time criteria of the tasks are satisfied; and
   (g) repeating steps (a) to (c) with a new task assignment to the processing units or repeating steps (d) to (f) with a new task assignment to the processes of the operational systems of the assigned processing units until costs of a current solution satisfy the predefined solution criterion.

2. The method of claim 1, wherein the repetition of the step (g) depends on optimisation heuristics.

3. The method of claim 1, wherein the step (d) of assigning the tasks to the processes of the operational systems of the assigned processing units assigned to the tasks comprises an event spectral analysis step for analysing input and output densities of events of the tasks.

4. The method of claim 3, wherein the event spectral analysis step takes into account data dependencies between the tasks.

5. The method according to claim 4, wherein in case of an admissible assignment of the tasks to the processes determined output densities of the events of the tasks are smaller than or equal to possible input densities of the events of subsequent tasks.

6. The method of claim 3, wherein the step (d) of assigning the tasks to the processes of the operational systems of the assigned processing units comprises a task partitioning step, wherein tasks are partitioned in accordance with their event input and output densities into partitions, whereupon in a next step the tasks of the partitions are assigned to the processes of the operational systems of the assigned processing units.

7. The method according to claim 6, wherein the task partitioning step comprises a comparison of input densities, or output densities, or input and output densities of the events of the tasks with predefined thresholds.

8. The method of claim 1, wherein a plurality of processes are combined into one process.

9. The method of claim 1, wherein in case of a plurality of tasks in one process, or a plurality of processes in one process, or a plurality of processes in one processing unit, a sequence of the plurality of tasks or the plurality of processes is determined by a scheduling method.

10. The method of claim 9, wherein the scheduling method is a time-controlled scheduling method or a priority-controlled scheduling method.

11. The method of claim 9, wherein the scheduling method is a time slot-based scheduling method.

12. The method of claim 1, wherein a mathematical real-time calculus method is used in the step (e) of checking whether the given task assignment to the processes of the operational systems of the processing units satisfies the predefined time criteria of the tasks.

13. The method of claim 1, wherein a task calculus method is used in the step (e) of checking whether the given task assignment to the processes of the operational systems of the processing units satisfies the predefined time criteria of the tasks.

14. The method of claim 1, wherein the processing units are processors.

15. The method of claim 1, wherein a cost calculation of the costs of step (f) takes into account energy consumption, electrical power consumption, operational temperature or chip area of at least one of the processing units.

16. The method of claim 1, wherein the solution criterion takes into account if the costs fall below a predefined cost threshold.

17. The method of claim 1, wherein the solution criterion takes into account if a cost minimum is found.

* * * * *